United States Patent [19]

Shiwaku et al.

[11] Patent Number: 5,523,135

[45] Date of Patent: Jun. 4, 1996

[54] BLOW-MOLDABLE POLYESTER RESIN COMPOSITION, AND BLOW MOLDED ARTICLES THEREOF

[75] Inventors: Toshio Shiwaku; Kenji Hijikata; Kenji Furui; Suzuki Masato, all of Shizuoka, Japan

[73] Assignee: Polyplastics Co., Ltd., Japan

[21] Appl. No.: 963,472

[22] Filed: Oct. 21, 1992

[30] Foreign Application Priority Data

Oct. 23, 1991 [JP] Japan ..................... 3-275477

[51] Int. Cl.$^6$ .............. B29D 22/00; C08K 3/40; C08L 67/02

[52] U.S. Cl. ............... 428/35.7; 428/36.8; 524/494; 524/513; 525/64; 525/169; 525/170; 264/165; 264/239

[58] Field of Search .................. 524/513, 494; 525/94, 169, 170, 171, 176, 64; 264/312, 318.1; 428/35.7, 36.8

[56] References Cited

U.S. PATENT DOCUMENTS

| | | | |
|---|---|---|---|
| 4,753,980 | 6/1988 | Deyrup ..................... | 525/176 |
| 4,962,157 | 10/1990 | Taubitz et al. ............ | 525/92 |
| 4,968,731 | 11/1990 | Lausberg et al. ......... | 525/64 |
| 5,112,914 | 5/1992 | Mizuno et al. ........... | 525/151 |
| 5,128,404 | 7/1992 | Howe ...................... | 525/176 |
| 5,310,799 | 5/1994 | Carson et al. ............ | 525/176 |
| 5,373,057 | 12/1994 | Watanabe et al. ........ | 525/176 |

FOREIGN PATENT DOCUMENTS

| 162750 | 12/1979 | Japan. |
|---|---|---|
| 12745 | 1/1986 | Japan. |

*Primary Examiner*—Tae Yoon
*Attorney, Agent, or Firm*—Nixon & Vanderhye

[57] ABSTRACT

Polyester resin compositions which are especially adapted for use in blow-molding or extrusion-molding of shaped hollow articles is a melt-blend of (A) polyester base resin, and (B) a styrenic copolymer having between 40 to 97% by weight of units derived from styrene, between 3 to 60% by weight of a glycidyl ester of an α,β-unsaturated acid, and optionally up to 50% by weight of units derived from an auxiliary vinylic comonomer other than styrene. The styrenic copolymer is preferably present in the compositions in an effective amount between 0.5 to 10 parts by weight, per 100 parts by weight of the polyester base resin, sufficient to impart a melt tension of greater than 5.0 grams and a drawdown index of greater than 2.0 to the composition. The compositions may optionally contain up to 100 parts by weight (based on 100 parts by weight of the polyester base resin) of a fibrous, powdery or flaky filler material.

21 Claims, No Drawings

BLOW-MOLDABLE POLYESTER RESIN COMPOSITION, AND BLOW MOLDED ARTICLES THEREOF

FIELD OF THE INVENTION

The present invention relates generally to moldable polyester resin compositions. More specifically, the present invention is embodied in polyester resin compositions which are especially adapted to be employed in blow- or extrusion-molding of hollow articles.

SUMMARY OF THE INVENTION

Thermoplastic polyester resins are well known engineering plastics due to their well-balanced mechanical strength, thermal and chemical resistance, and electrical properties. As a result, polyester resins have been widely used to form a variety of useful articles and component parts. However, polyester resins have conventionally been limited to those articles and/or component parts which are formed by injection-molding. A recent trend is to employ polyester resins in more advanced and specialized end-use applications which demand that polyester resins be molded in a more efficient, and economically advantageous manner in blow-molding or extrusion-molding operations.

In this regard, pipes and tanks that are used in an automobile's engine compartment have typically exclusively been constructed of metal since such articles and components must withstand a high-temperature environment and exhibit high mechanical strength properties. Polyester resins therefore are likely candidate materials for use in forming components used in an automobile's engine compartment due to their excellent properties as mentioned above. In addition, polyester resin components in an automobile's engine compartment would be especially desirable since a weight reduction would be realized as compared to metal. Polyester resin components would also be rust-proof and would offer the automobile manufacturer savings in assembly costs as compared to metal components. The use of polyester resins to form extrusion-molded articles such as films, tubes and electrical wire coatings would also be advantageous.

Polyester resins have typically not been employed in blow-molding or extrusion-molding operations to form hollow shaped articles due to the low melt tension (and hence high drawdown) characteristics of polyester resins. Thus, although polyester resins represent an attractive alternative material to form hollow metal components employed in an automobile's engine compartment, for example, there has not been a satisfactory solution to date in overcoming the low melt tension characteristics of polyester resins generally.

There have been some proposals, however, which attempt to address the low melt tension characteristics of polyester resins. For example, attempts have been made to use a polyester resin having a branched structure, a high degree of polymerization and/or a high intrinsic viscosity (IV) when forming hollow articles by blow-molding or extrusion-molding operations. Furthermore, a variety of filler materials have been added to polyester resins in an attempt to improve its melt-tension characteristics. While such prior attempts have somewhat overcome the low melt tension characteristics of polyester resins, there is still insufficient improvement to an extent which would allow polyester resins to be used reliably in blow-molding or extrusion-molding operations to form hollow shaped articles.

More specifically, improvements in melt-tension of polyester resins have been attempted by incorporating a branching agent, such as an isocyanate or epoxy compound, into the polyester resin as disclosed in Japanese Patent Publication Nos. 80391/1977 and 114687/1977. However, such an additive component is not sufficiently effective and, moreover, renders the moldability of the composition unstable such that molded articles of consistent quality cannot always be obtained.

Improvements to the melt-tension and blow-moldability of polyester resins have also been attempted by incorporating an ethylene/$\alpha,\beta$-unsaturated glycidyl ester copolymer into the polyester resin as disclosed in Japanese Patent Publication Nos. 162750/1979 and 12745/1986. These published Japanese patent disclosures also suggest that the effect of such an additive is further improved by the conjoint presence of a trivalent phosphorous compound. However, the present applicants have found that an ethylene copolymer having a glycidyl group must be used in relatively large amounts and that, even when such large amounts are used, the melt tension improvements are insufficient. In addition, the present applicants have found that the conjoint presence of a trivalent phosphorus compound with a glycidyl group-containing ethylene copolymer results in significant increases in the polyester resin melt viscosity, but insignificant increases in the polyester resin melt tension. Furthermore, even when a desirable melt tension is achieved using such components, the blow-moldability of the resin is poor and commercially unusable due to the occurrence of poor fluidity characteristics and/or partial gelation. As a result, the surface conditions of molded articles formed of such a conventional resin composition are impaired.

What has been needed in this art, therefore, is a polyester resin composition which exhibits desirable melt properties to allow the resin to be blow-molded or extrusion-molded and thereby form hollow shaped articles in a labor and cost efficient manner. It is towards providing such a polyester resin composition and such hollow shaped articles that the present invention is directed.

Broadly, the present invention relates to blow-moldable and extrusion-moldable polyester resin compositions and to hollow shaped articles formed thereof whereby a minor (but effective) amount of a specific styrenic copolymer is melt-blended with a polyester base resin. More specifically, the present invention provides a polyester resin composition useful in blow-molding and extrusion-molding operations which is a melt-blend of a polyester base resin, and a styrenic copolymer which is comprised of between 40 to 97% by weight of units derived from styrene, between 3 to 60% by weight of units derived from a glycidyl ester of an $\alpha,\beta$-unsaturated acid, and optionally, up to 50% by weight of units derived from an auxiliary vinylic comonomer other than styrene. The compositions of this invention may also include up to 100 parts by weight of at least one fibrous, powdery and flaky filler material.

Further aspects and advantages of this invention will become more clear after careful consideration is given to the following detailed description of the preferred exemplary embodiments.

DETAILED DESCRIPTION OF THE PREFERRED EXEMPLARY EMBODIMENTS

In preferred embodiments, the polyester resin compositions according to this invention will be a melt-blend of:

(A) 100 parts by weight of a thermoplastic polyester base resin which is the reaction product of an aromatic dicarboxylic acid or an ester-forming derivative thereof and an aliphatic dihydroxy compound having 2 to 8 carbon atoms;

(B) between 0.5 to 10 parts by weight of a styrenic copolymer comprised of between 40 to 97% by weight of of units derived from styrene, between 3 to 60% by weight of units derived from a glycidyl ester of an α,β-unsaturated acid, and between 0 to 50% by weight of units derived from an auxiliary vinylic comonomer other than styrene; and optionally (C) between 0 to 100 parts by weight of a filler material.

The thermoplastic polyester base resin (A) that may be used in the compositions of the present invention is obtained mainly by the polycondensation of an aromatic dicarboxylic acid with an aliphatic dihydroxy compound having 2 to 8 carbon atoms. The effects attributable to the compositions of the present invention are obtained irrespective of the polyester base resin (A) being a homopolyester or a copolyester.

Examples of the aromatic dicarboxylic acid constituting the thermoplastic polyester base resin (A) include known aromatic dicarboxylic acids such as terephthalic acid, isophthalic acid, naphthalenedicarboxylic acid and diphenyldicarboxylic acid and ester-forming derivatives thereof. They may be used either alone or in combinations of two or more of the same. It is preferable to use mainly terephthalic acid or an ester-forming derivative thereof.

Examples of the aliphatic dihydroxy compound having 2 to 8 carbon atoms which is another main constituent of the polyester base resin (A) of the present invention include ethyleneglycol, propylene glycol, butanediol, neopentyl glycol, hexanediol, cyclohexanediol, cyclohexanedimethanol, diethylene glycol and triethylene glycol as well as substituted derivatives thereof. They are likewise usable either alone or in the form of a mixture of two or more such compounds. Among the, those mainly comprising an aliphatic dihydroxy compound having 2 to 4 carbon atoms are preferred.

The comonomers usable in addition to the above-described monomers for forming a copolyester base resin include dicarboxylic acids such as diphenyl ether, dicarboxylic acid, α,β-bis(4-carboxyphenoxy)ethane, adipic acid, sebacic acid, azelaic acid, decanedicarboxylic acid, dodecanedicarboxylic acid, cyclohexanedicarboxylic acid and dimer acids as well as ester-forming derivatives thereof; glycols such as pentanediol, neopentyl glycol, hexanediol, octanediol, decanediol, cyclohexanedimethapol, hydroquinone, bisphenol A, 2,2-bis(4'-hydroxyethoxyphenyl)propane, xylene glycol, polyethylene glycol, polytetramethylene glycol and aliphatic polyester oligomers having a hydroxyl group at each end; hydroxy carboxylic acids such as glycolic acid, hydroxamic acid, hydroxybenzoic acid, hydroxyphenylacetic acid and naphthylglycolic acid; and lactones such as propiolactone, butyrolactone, caprolactone and valerolactone.

A polyester having a branched or crosslinked structure and comprising a polyfunctional ester-forming component such as trimethylolpropane, trimethylolethane, pentaerythritol, trimellitic acid, trimesic acid or pyromellitic acid can also be used provided that the polyester base resin retains its thermoplastic character. The polyester may comprise an ester-forming component having an ionic group, such as sulfoisophthalic acid or sodium p-hydroxyethylphenyl sulfonate.

The polyester may also be a halogenated copolyester produced from a compound comprising an aromatic ring containing a halogen compound as a substituent and an ester-forming group, such as dibromoterephthalic acid, tetrabromoterephthalic acid, tetrachloroterrephthalic acid, 1,4-dimethyloltetrabromobenzene, tetrabromobisphenol A, and ethylene oxide or propylene oxide adduct of tetrabromobisphenol A.

Particularly preferred polyester resins include polybutylene terephthalate (PBT) and copolymers mainly comprised of polybutylene terephthalate units. Particularly preferred comonomer components forming such PBT copolymers include isophthalic acid, ethylene glycol, bisphenol A, cyclohexanedimethanol, 2,2-bis(β-hydroxyethoxyphenyl) propane, 2,2-bis(β-hydroxyethoxytetrabromophenyl)propane and polytetramethylene glycol. Polybutylene terephthalate copolymers having suitably branched or crosslinked structures obtained by the polycondensation with a small amount of one of the above-described comonomers having three or more ester-forming functional groups are also particularly preferred polyesters.

The viscosity of the polyester base resin (A) used in the present invention is not particularly limited provided that the viscosity characteristics allow the polyester base resin to be molded. Usually polyesters having an intrinsic viscosity of between 0.6 to 2.0 are usable. It is a characteristic feature of the present invention that even a polyester having a low viscosity can be blow-molded by virtue of the conjoint presence of the styrchic copolymer component (B). However, a polyester having an excessively high viscosity in and of itself is not preferred, since it exhibits insufficient fluidity.

The styrenic copolymer (B) which is necessarily used in the compositions of this invention for improving blow-moldability and extrusion-moldability is generally comprised of units derived from styrene and a glycidyl ester of an α,β-unsaturated acid. The amount of styrene units constituting such a copolymer is preferably 40 to 97% by weight, particularly 50 to 95% by weight.

The glycidyl ester of an α,β-unsaturated acid which is another indispensable constituent of the styrenic copolymer (B) is a compound of the following general formula (1):

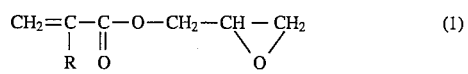

wherein R represents a hydrogen atom, a lower alkyl group or a glydicyl ester group.

Compounds within the definition of Formula (1) include, for example, glycidyl acrylate, glycidyl methacrylate, glycidyl ethacrylate and glycidyl itaconate, among which glycidyl methacrylate is particularly preferred.

The amount of glycidyl ester units in the copolymer is preferably between 3 to 60% by weight, and particularly between 5 to 50% by weight. When the amount of glycidyl ester units is too large, the composition is apt to gel and thereby impair blow-moldability as well as the surface condition of the molded article. If too little an amount of glycidyl ester units is present, then no improvement in the blow moldability (e.g. improvement in melt tension and/or reduced drawdown) can be obtained.

The styrenic copolymer (B) to be used in the compositions of the present invention may be a multicomponent copolymer produced by copolymerizing one or more specified vinyl monomers in addition to the above-described indispensable components. Preferred examples of optional third components include acrylonitrile, vinyl chloride, α-methyl styrene, brominated styrene and phenylmaleimide, among which, acrylonitrile is most desirable. A terpolymer comprising 50% by weight or less, and preferably 40% by weight or less, of acrylonitrile significantly improves the blow moldability of the polyester composition. The multicomponent copolymer may further contain a small amount of another vinyl monomer as an auxiliary component in addition to the above-described components. However, the incorporation of an olefinic monomer such as ethylene, propylene or butene-1 is not preferred, since such a monomer tends to impair the effect that would otherwise be attainable. Particularly, any copolymer containing 40% by weight or more of ethylene is outside the scope of the present invention, since the incorporation of such a large amount of ethylene seriously impairs melt tension drawdown resistance characteristics thereby degrading its blow-moldability, as well as the surface condition of the molding.

The styrenic copolymer (B) of the present invention can easily be produced from the above-described monomers by ordinary radical polymerization techniques in the presence of a radical polymerization catalyst.

The styrenic copolymer (B) of the present invention may also be a graft copolymer comprised of the above-described linear styrenic copolymer which is further chemically combined with a small amount of another vinyl polymer to form a branched or crosslinked structure. Examples of the vinyl monomer constituting the branched or crosslinked segment include acrylic acid, alkyl acrylates, mathacrylic acid, alkyl methacrylates, styrane and acrylonitrile. A graft copolymer can be obtained by copolymerizing at least one of the above-described vinyl monomers with a radical-polymerizable organic peroxide in the presence of the above-described linear styrenic copolymer to form a copolymer containing a peroxide which is then melt-kneaded. It is to be noted, however, that the styrenic component (B) to be used in the compositions of the present invention must be fluid at the melt-blending temperature. A too highly grafted styrenic copolymer has reduced fluidity and poor dispersibility in the polyester base resin, thus unfavorably impairing improvements in the blow moldability and the surface condition of the molding.

The amount of the styrenic copolymer (B) is between 0.5 to 10 parts by weight, preferably between 1 to 8 parts by weight, per 100 parts of the polyester base resin component (A). When the amount of the styrenic copolymer is too small, the intended effect of the present invention, i.e. improvement in the blow-moldability cannot be obtained. If the styrenic copolymer is present in excessive amounts, then the entire system gels. The styrenic copolymer (B) should be present in the compositions of this invention in amounts within the above-noted ranges so as to impart to the polyester compositions a melt tension of at least about 2.5 grams (preferably at least about 5.0 grams, and most preferably at least about 10.0 grams) and a drawdown index of at least about 2.00 (and preferably at least about 2.15).

The polyester resin compositions of the present invention may further contain a fibrous, powdery or platy filler as an optional component (C) depending on the properties that may be desired. The filler is effective to improve the mechanical properties, particularly strength and rigidity, of the molded articles.

Examples of the fibrous filler include inorganic fibrous substances, such as fibers of glass, asbestos, carbon silica/ alumina, zirconia, boron nitride, silicon nitride, boron and potassium titanate, and fibers of metals, such as stainless steel, aluminum, titanium, copper and brass. A particularly typical fibrous filler is glass fiber.

The powdery fillers include carbon black; silicates such as silica, quartz powder, glass beads, glass powder, calcium silicate, aluminum silicate, kaolin, talc, clay, diatomaceous earth and wollastonite; metal oxides such as iron oxide, titanium oxide, zinc oxide and alumina; metal carbonates such as calcium carbonate and magnesium carbonate; metal sulfates such as calcium sulfate and barium sulfate; silicon carbide; silicon nitride; boron nitride; and various metal powders.

The platy fillers include mica, glass flakes and various metal foils.

These inorganic fillers are usable either alone or in combination of two or more of the same. A combination of the fibrous filler, particularly glass fiber, with a powdery and/or platy filler is preferred for producing a molding having improved mechanical strength, dimensional accuracy and electrical properties, and particularly improved blow-moldability.

The filler is used desirably in combination with a binder or a surface-treating agent, examples of which include functional compounds such as epoxy, isocyanate, titanate and silane compounds.

The amount of the filler (C), if used in the compositions of the present invention; is 100 parts by weight or less, preferably 70 parts by weight or less, per 100 parts by weight of the polyester base resin (A). The rigidity and strength of the molding are apt to be lowered if too little an amount of filler is used, while the molding operation will be hindered unfavorably if its presence exceeds 100 parts by weight.

The polyester resin composition of the present invention may contain a small amount of one or more auxiliary thermoplastic resin in addition to the components described above.

The "auxiliary thermoplastic resin" usable herein may be any thermoplastic resin stable at high temperature, such as styrenic (co)polymers other than those described above, polycarbonates, polyphenylene oxides, polyalkyl acrylates, polyacetals, polysulfones, polyether sulfones, polyesther imides, polyether ketones and fluororesins. These thermoplastic resins may be used either alone or in the form of a mixture of two or more of the same.

The polyester resin composition of the present invention may contain known substances usually incorporated into synthetic resins, such as stabilizers, e.g. antioxidants and ultraviolet absorbers; antistatic agents; flame retardants; colorants, e.g. dyes and pigments; lubricants; releasing agents; crystallization accelerators; and nucleating agents suitably for the demanded properties.

In the blow-molding method of the present invention, the above-described styrenic copolymer (B) is added to the polyester resin (A), and the mixture is, if necessary, melt-kneaded with any of the desired component(s) before being blow-molded. In the melt-kneading of the components, they rare pelletized using a single-screw or a double-screw extruder before being subjected to blow molding or, alternatively, the melt-kneaded mass is immediately molded to form a parison and then subjected to blow-molding.

In the present invention, blow-molding is conducted in an ordinary manner on conventional blow-molding machines usually used for the blow-molding of thermoplastic resins. More specifically, a hollow molded article is produced by plasticizing the polyester resin composition using an extruder or the like, extruding or injecting the plasticized composition through an annular die to form an annular molten or softened parison as the intermediate, placing the parison in a mold, blowing a gas into the parison to inflate it and cause the parison to conform to the mold cavity walls and then solidifying the inflated parison by cooling. As for the molding conditions of the polyester resin composition of the present invention, the temperature of each of the cylinder and the die is preferably between 200° to 290° C., and particularly preferably between 230° to 260° C., when polybutylene terephthalate is used as the base resin component (A). The temperature of the mold is preferably between 40° to 130° C., particularly between 80° to 100° C. The gas to be blown into the parison may be air, nitrogen or any other gas. From an economic viewpoint, air is usually used under a blowing pressure of preferably 3 to 10 kg/cm². Furthermore, special blow-molding machines such as a three-dimensional molding machine, may also be used. It is also possible to form a multilayered molding by forming one or more layers of the composition of the present invention and combining them (e.g. via coextrusion) with layers made from other materials.

The polyester resin compositions of the present invention have a melt tension higher than that of conventional polyester resins compositions; prevents parison draw-down; has remarkably improved blow moldability or extrusion-moldability characteristics; and is capable of forming a hollow molded shaped article exhibiting excellent mechanical and thermal resistance properties as well as having a uniform thickness and good appearance. Furthermore, the compositions of this invention provide hollow molded shaped articles usable even under severe ambient conditions, such as intake manifolds of automobiles, suction and exhaust parts around an engine, vessels for high-temperature liquids, chemicals and solvents, chambers for pipes and floats, and tubular articles (including those having an irregular shape).

EXAMPLES

The following Examples will further illustrate the present invention, but which by no means limit the invention.

The methods for determining the various properties in the following Examples were as follows:

(1) Intrinsic viscosity of polyester: The intrinsic viscosity was determined in o-chlorophepol at 25° C.

(2) Melt tension: The load applied when a resin flowing from an orifice having a diameter of 1 mm at a drawdown ratio of 10 at 255° C. was determined with a load cell using a capillary rheometer.

(3) Melt viscosity: The melt viscosity at a shear rate of 100 sec$^{-1}$ was determined using a capillary rheometer with an orifice having a diameter of 1 mm and a length of 10 mm at 255° C.

(4) Tensile strength: The strength was determined according to ASTM D-638.

(5) Blow moldability:

(i) Drawdown: Drawdown was evaluated in terms of the ratio (i.e. drawdown index) of the time taken for a 120 mm length of parison extruded from the blow molding machine to achieve a length of 600 mm. A resin completely free from the drawdown has a drawdown index of 5, and a resin which draw downs instantaneously has a drawdown index of 1.

(ii) Breakage During Blow Molding: The occurrence of breakage of the material was visually observed during blow-molding.

(iii) Thickness Uniformity of the Molded Article: A cylindrical molded article was cut and the thickness of each of the upper part, central part and lower part thereof was determined with a micrometer to determine the thickness variation (percentage of the difference between the maximum thickness and the minimum thickness to the average thickness.

(iv) Appearance: The surface smoothness (roughness) was visually observed with the results being classified into three ranks of "excellent", "good." and "bad"

Examples 1 to 6 and Comparative Examples 1 and 2

A styrene/glycidyl methacrylate copolymer (S/G copolymer) was compounded with 100 parts by weight of each of polybutylene terephthalates (PBT) having varied intrinsic viscosities as specified in Table 1. The mixture was melt-kneaded on a double-screw extruder into pellets of a polyester resin composition.

A 500-ml cylindrical vessel having an average thickness of 2.5 mm was produced from the pellets on a blow-molding machine (S-45ND mfd. by Placo Co., Ltd. ) under conditions comprising a cylinder temperature of 250° C., a die (diameter: 50 mm, distance: 3 mm) temperature of 250° C., a mold temperature of 80° C. and an average blow pressure of 5 kg/cm². During the blow-molding operation, the moldability characteristics including drawdown, parison breakage, thickness uniformity of the molded article and appearance (surface roughness and unevenness) were evaluated.

For comparison, the same test procedure as that described above, except that no S/G polymer was used, was conducted. The results are given in Table 1.

Examples 7 to 13 and Comparative Examples 3 to 8

Resin compositions comprising PBT and various S/G copolymers listed in Table 2 were subjected to the same test as that described above. For comparison, the same procedure as that described above was repeated except that a glycidyl-containing copolymer which was different from the component: (B) of the present invention was used. The results are given in Table 2.

Examples 14 to 19 and Comparative Examples 9 to 12

The same test as that of Example 3 was repeated except that PBT was replaced with various PBT copolymers listed in Table 3. For comparison, the same procedure as that described above was repeated except that no S/G copolymer was used. The results are given in Table 3.

Examples 20 to 22 and Comparative Examples 13 to 15

The same test as that described above was repeated except that the PBT polyester (A) was replaced with other polyesters. For comparison, the same procedure as that described above was repeated except that no S/G copolymer was used. The results are given in Table 4.

Examples 23 to 25 and Comparative Examples 16 to 19

The same test as that described above was repeated except that an S/G copolymer and glass fibers as a filler were compounded as given in Table 5. For comparison, the same procedure as that described above was repeated except that no S/G copolymer was used. In this case, the melt tension was determined at a drawdown ratio of 2.

TABLE 1

| | | Ex. 1 | Ex. 2 | Ex. 3 | Ex. 4 | Ex. 5 | Ex. 6 | Comp. Ex. 1 | Comp. Ex. 2 |
|---|---|---|---|---|---|---|---|---|---|
| Compn. | component (A) | | | | | | | | |
| | variety (intrinsic viscosity) | PBT (1.40) | PBT (1.00) | PBT (1.00) | PBT (1.00) | PBT (0.83) | PBT (0.65) | PBT (1.40) | PBT (1.00) |
| | pt. by wt. | 100 | 100 | 100 | 100 | 100 | 100 | 100 | 100 |
| | component (B) | | | | | | | | |
| | variety | S/G | " | " | " | " | " | — | — |
| | ratio*1 | 80/20 | 80/20 | 80/20 | 80/20 | 80/20 | 80/20 | | |
| | pt. by wt. | 1.5 | 1.5 | 2.5 | 5.0 | 5.0 | 8.0 | | |
| | component (C) | — | — | — | — | — | — | — | — |
| Properties | melt tension [g] | 7.0 | 2.8 | 5.9 | 11.6 | 5.2 | 5.4 | 0.25 | 0.06 |
| Blow moldability | drawdown Index | 2.99 | 2.00 | 2.33 | 3.04 | 2.15 | 2.09 | 1.14 | 1.05 |
| | breakage In blowing | none | none | none | none | none | none | molding impossible | molding impossible |
| | thickness uniformity [%] | 17 | 20 | 15 | 13 | 21 | 25 | | |
| | appearance | good | excellent | excellent | excellent | excellent | excellent | | |

Note) *1 weight ratio, S: styrene, G: glycidyl methacrylate

TABLE 2

| | Ex. 2 | Ex. 7 | Ex. 8 | Ex. 9 | Ex. 10 | Ex. 11 | Ex. 12 | Ex. 13 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|---|---|---|---|---|
| Compn. | | | | | | | | | | | | | | |
| component (A) | | | | | | | | | | | | | | |
| variety (intrinsic viscosity) | PBT (1.00) | " | " | " | " | " | " | " | " | " | " | " | " | " |
| pt. by wt. | 100 | | | | | | | | | | | | | |
| component (B) | | | | | | | | | | | | | | |
| variety | S/G | S/G | S/G | S/AN/G | S/AN/G | S/V-Cl/G | S/Br-S/G | S/PhMI/G | E/G | E/G | E/G | E/G | MMA/G | NMP/G |
| ratio*1 | 80/20 | 50/50 | 50/50 | 56/24/20 | 56/24/20 | 56/24/20 | 56/24/20 | 56/24/20 | 80/20 | 80/20 | 90/10 | 90/10 | 80/20 | 80/20 |
| pt. by wt. | 2.5 | 1.0 | 1.5 | 1.5 | 2.5 | 2.5 | 2.5 | 2.5 | 2.5 | 2.5 | 10.0 | 10.0 | 2.5 | 2.5 |
| component (C) | — | — | — | — | — | — | — | — | — | — | — | — | — | — |
| Properties | | | | | | | | | | | | | | |
| melt tension (g) | 5.9 | 15.2 | 21.1 | 17.4 | 35.0 | 12.5 | 11.3 | 22.0 | 0.45 | 1.7 | 1.5 | 3.0 | 0.48 | 1.5 |
| melt viscosity [poise] | 13900 | 21000 | 27000 | 13000 | 23900 | 18000 | 17500 | 21800 | 11000 | 14000 | 21000 | 32000 | 5200 | 5900 |
| tensile strength [kg/cm$^2$] | 568 | 563 | 555 | 553 | 540 | 559 | 560 | 551 | 565 | 553 | 489 | 479 | 582 | 577 |
| Blow moldability | | | | | | | | | | | | | | |
| drawdown index | 2.33 | 2.05 | 3.34 | 2.31 | 3.55 | 2.59 | 2.41 | 3.32 | 1.25 | 1.50 | 1.44 | 1.90 | 1.20 | 1.31 |
| breakage in blowing | none | none | none | none | none | none | none | none | molding impossible | molding impossible | breakage | none | molding impossible | molding impossible |
| thickness uniformity [%] | 15 | 17 | 18 | 15 | 17 | 18 | 13 | 20 | | | — | 35 | | |
| appearance | excellent | good | excellent | excellent | good | excellent | good | good | | | | bad | bad | |

Note) *1 weight ratio, S: styrene, G: glycidyl methacrylate, AN: acrylonitrile, V-Cl: vinyl chloride, Br-S: brominated styrene, PhMI: phenylmaleimide, E: ethylene, MMA: methyacrylate, NMP: N-methylpyrrolidone
*2 further containing 1.0 part by weight of triphonyl phosphile.

TABLE 3

|  | Ex. 14 | Ex. 15 | Ex. 16 | Ex. 17 | Ex. 18 | Ex. 19 | Comp. Ex. 9 | Comp. Ex. 10 | Comp. Ex. 11 | Comp. Ex. 12 |
|---|---|---|---|---|---|---|---|---|---|---|
| Compn. | | | | | | | | | | |
| component (A) variety | PBT copolymer contg. 0.6 molar % of trimellitic acid | PBT copolymer contg. 0.15 molar % of trimesic acid | PBT copolymer contg. 0.8 molar % of sodium sulfophthalate | PBT copolymer contg. 12.5 molar % of isophthalic acid | PBT copolymer contg. 12.5 molar % of ethylene glycol | polyester ether elastomer (PBT 60 wt. %) | PBT copolymer contg. 0.15 molar % of trimesic acid | PBT copolymer contg. 0.8 molar % of sodium sulfophthalate | PBT copolymer contg. 12.5 molar % of isophthalic acid | polyester ether elastomer (PBT 60 wt. %) |
| (intrinsic viscosity) | (1.00) | (1.15) | (1.20) | (1.00) | (1.10) | (1.40) | (1.15) | (1.20) | (1.00) | (1.40) |
| pt. by wt. | 100 | 100 | 100 | 100 | 100 | 100 | 100 | 100 | 100 | 100 |
| component (B) | | | | | | | | | | |
| variety | S/G | " | " | " | " | " | — | — | — | — |
| ratio*1 | 80/20 | | | | | | | | | |
| pt. by wt. | 2.5 | | | | | | | | | |
| component (C) | — | — | — | — | — | — | — | — | — | — |
| Properties melt tension [g] | 5.4 | 7.8 | 11.5 | 4.3 | 4.5 | 5.1 | 1.9 | 1.3 | 0.02 | 0.60 |
| Blow moldability | | | | | | | | | | |
| drawdown index | 2.31 | 2.82 | 2.88 | 2.10 | 2.14 | 2.81 | 1.74 | 1.29 | 1.15 | 1.29 |
| breakage in blowing | none | none | none | none | none | none | none | breakage | molding impossible | molding impossible |
| thickness uniformity [%] | 19 | 13 | 17 | 21 | 24 | 14 | 55 | — | | |
| appearance | excellent | good | excellent | excellent | excellent | excellent | bad | bad | | |

TABLE 4

|  | Ex. 20 | Ex. 21 | Ex. 22 | Comp. Ex. 13 | Comp. Ex. 14 | Comp. Ex. 15 |
|---|---|---|---|---|---|---|
| Compn. component (A) | | | | | | |
| variety | polyethylene terephthalate (PET) | PET copolymer contg. 20 molar % of cyclohexane dimethanol | polybutylene naphthalate | polyethylene terephthalate (PET) | PET copolymer contg. 20 molar % of cyclohexanedimethanol | polybutylene naphthalate |
| (intrinsic viscosity) | (1.00) | (0.80) | (1.05) | (1.00) | (0.80) | (1.05) |
| pt. by wt. | 100 | 100 | 100 | 100 | 100 | 100 |
| component (B) | | | | | | |
| variety | S/G | " | " | — | — | — |
| ratio*1 | 80/20 | | | | | |
| pt. by wt. | 2.5 | | | | | |
| component (C) | — | — | — | — | — | — |
| Properties melt tension [g] | 3.8*3 | 4.7 | 6.2 | 0.32*3 | 0.29 | 0.35 |
| Blow moldability | | | | | | |
| drawdown index | 2.01*3 | 2.55 | 2.15 | 1.22*3 | 1.20 | 1.15 |
| breakage in blowing | none | none | none | molding impossible | molding impossible | molding impossible |
| thickness uniformity [%] | 27 | 19 | 21 | | | |
| appearance | excellent | excellent | good | | | |

*3 data determined at 270° C.

TABLE 5

|  | Ex. 23 | Ex. 24 | Ex. 25 | Comp. Ex. 16 | Comp. Ex. 17 | Comp. Ex. 18 | Comp. Ex. 19 |
|---|---|---|---|---|---|---|---|
| Compn. component (A) | | | | | | | |
| variety (intrinsic viscosity) | PBT (1.00) | " | " | " | " | " | " |
| pt. by wt. | 100 | | | | | | |
| component (B) | | | | | | | |
| variety | S/G | " | S/AN/G | — | — | E/G | E/G |
| ratio*1 | 80/20 | 80/20 | 56/24/20 | | | 80/20 | 90/10 |
| pt. by wt. | 2.5 | 2.5 | 1.5 | | | 2.5 | 10.0 |
| component (C) | | | | | | | |
| glass fiber pt. by wt. | 15 | 30 | 15 | 15 | 15 | 15 | 15 |
| Properties | | | | | | | |
| melt tension*4 [g] | 17 | 26 | 41 | determination impossible | " | 3.3 | 5.8 |
| melt viscosity [poise] | 37100 | 42000 | 39000 | 7000 | 9200 | 32000 | 61000 |
| Blow moldability | | | | | | | |
| drawdown index | 4.17 | 4.56 | 4.32 | 1.08 | 1.16 | 1.42 | 2.10 |
| breakage in blowing | none | none | none | molding impossible | molding impossible | breakage | none |
| thickness uniformity [%] | 25 | 28 | 22 | | | — | 55 |
| appearance | good | good | good | | | bad | bad |

Note) *4 determined at a drawdown ratio of 2.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A blow-moldable polyester resin composition consisting of:
   (A) 100 parts by weight of a thermoplastic polyester resin which is comprised mainly of units derived from an aromatic dicarboxylic acid which is one selected from the group consisting of terephthalic acid, isophthalic acid, napthalenedicarboxylic acid and diphenyldicarboxylic acid or an ester forming derivative thereof, and an aliphatic dihydroxy compound having 2 to 8 carbon atoms;
   (B) between 0.5 to 10 parts by weight of a styrenic copolymer consisting essentially of (i) between 40 to 97% by weight of units derived from styrene, (ii) between 3 to 60% by weight of units derived from a glycidyl ester of an α, β-unsaturated acid, and (iii) an effective amount of 50% by weight or less of acrylonitrile to improve blow-moldability of the polyester resin composition; and optionally
   (C) up to 100 parts by weight of a filler material.

2. A blow-moldable polyester resin composition as in claim 1, wherein said thermoplastic polyester resin is a polybutylene terephthalate polymer.

3. A blow-moldable polyester resin composition as in claim 1, wherein said thermoplastic polyester resin is a polybutylene terephthalate copolymer comprised mainly of polybutylene terephthalate units.

4. A blow-moldable polyester resin composition as in claim 1, wherein said filler material includes one or more fillers selected from the group consisting of fibrous, powdery and flaky fillers.

5. A blow-moldable polyester resin composition as in claim 1, wherein said filler material is glass fiber.

6. A blow-moldable polyester resin composition consisting of:
   (A) a thermoplastic polyester base resin; and
   (B) a styrenic copolymer which consists essentially of (i) between 40 to 97% by weight of units derived from styrene, (ii) between 3 to 60% by weight of a glycidyl ester of an α,β-unsaturated acid, and (iii) an effective amount of 50% by weight or less of acrylonitrile to improve blow-moldability of the polyester resin composition, wherein said styrenic copolymer is present in the composition in an effective amount between 0.5 to 10 parts by weight, per 100 parts by weight of said thermoplastic polyester resin, sufficient to impart to the composition a melt tension of greater than 2.5 grams and a drawdown index of greater than 2.0.

7. A blow-moldable polyester base resin composition as in claim 6, wherein said thermoplastic polyester resin is a polybutylene terephthalate or polyethylene terephthalate polymer.

8. A blow-moldable polyester resin composition as in claim 6, wherein said thermoplastic polyester resin is a polybutylene terephthalate copolymer comprised mainly of recurring polybutylene terephthalate units.

9. A blow-moldable polyester resin composition consisting of:
   (A) a thermoplastic polyester base resin;
   (B) a styrenic copolymer which consists essentially of (i) between 40 to 97% by weight of units derived from styrene (ii) between 3 to 60% by weight of a glycidyl ester of an α, β-unsaturated acid, and (iii) an effective amount of 50% by weight of less of acrylonitrile to improve blow-moldability of the polyester resin composition; and (C) up to 100 parts by weight, based on 100 parts by weight of the polyester base resin, of a filler material, and wherein said styrenic copolymer is present in the composition in an effective amount between 0.5 to 10 parts by weight, per 100 parts by weight of said polyester base resin, sufficient to impart to the composition a melt tension of greater than 2.5 grams and a drawdown index of greater than 2.0.

10. A blow-moldable polyester resin composition as in claim 9, wherein said filler material includes one or more fillers selected from the group consisting of fibrous, powdery and flaky fillers.

11. A blow-moldable polyester resin composition as in claim 9, wherein said filler material is glass fiber.

12. A shaped blow-molded hollow article formed of a composition consisting of:

(A) 100 parts by weight of a thermoplastic polyester resin which is comprised mainly of units derived from an aromatic dicarboxylic acid which is one selected from the group consisting of terephthalic acid, isophthalic acid, napthalenedicarboxylic acid and diphenyldicarboxylic acid or an ester forming derivative thereof, and an aliphatic dihydroxy compound having 2 to 8 carbon atoms;

(B) between 0.5 to 10 parts by weight of a styrenic copolymer consisting essentially of (i) between 40 to 97% by weight of units derived from styrene, (ii) between 3 to 60% by weight of units derived from a glycidyl ester of an α, β-unsaturated acid, and (iii) an effective amount of 50% by weight or less of acrylonitrile to improve blow-moldability of the polyester resin composition; and optionally (C) up to 100 parts by weight of a filler material.

13. A blow-molded hollow article as in claim 12, wherein said thermoplastic polyester resin is a polybutylene terephthalate or polyethylene terephthalate polymer.

14. A blow-molded hollow article as in claim 12, wherein said thermoplastic polyester resin is a polybutylene terephthalate copolymer comprised mainly of recurring polybutylene terephthalate units. base resin, of a filler material.

15. A blow-molded hollow article as in claim 12, wherein said filler material includes one or more fillers selected from the group consisting of fibrous, powdery and flaky fillers.

16. A blow-molded hollow article as in claim 12, wherein said filler material is glass fiber.

17. A blow-moldable polyester resin composition as in claim 6, wherein said composition has a melt tension of at least 5.0 grams and a drawdown index of at least 2.15.

18. A blow-molded hollow article as in claim 12, wherein said polyester resin composition has a melt tension of at least 2.5 grains and a drawdown index of at least 2.0.

19. A process for producing a blow-molded hollow article, which comprises blow-molding the polyester resin composition as in claim 1.

20. A process for producing a blow-molded hollow article as in claim 19, wherein said filler material includes one or more fillers selected from the group consisting of fibrous, powdery and flaky fillers.

21. A process for producing a blow-molded hollow article as in claim 19, wherein said filler material is glass fiber.

* * * * *